United States Patent
Ludois et al.

(10) Patent No.: US 11,990,801 B2
(45) Date of Patent: May 21, 2024

(54) SINGLE SUBSTRATE RESOLVER/RECTIFIER FOR BRUSHLESS WOUND FIELD SYNCHRONOUS MACHINES

(71) Applicant: Wisconsin Alumni Research Foundation, Madison, WI (US)

(72) Inventors: Daniel Colin Ludois, Middleton, WI (US); Marisa Tisler, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 255 days.

(21) Appl. No.: 17/649,477

(22) Filed: Jan. 31, 2022

(65) Prior Publication Data

US 2022/0158529 A1    May 19, 2022

Related U.S. Application Data

(63) Continuation-in-part of application No. 16/534,735, filed on Aug. 7, 2019, now Pat. No. 11,239,732.

(51) Int. Cl.
*H02K 13/00* (2006.01)
*H01R 39/02* (2006.01)
*H02K 13/14* (2006.01)

(52) U.S. Cl.
CPC ........... *H02K 13/003* (2013.01); *H01R 39/02* (2013.01); *H02K 13/14* (2013.01)

(58) Field of Classification Search
CPC ...... H02K 13/003; H02K 13/14; H02K 19/36; H02K 19/365; H02K 19/10; H02K 13/00; H02K 11/0094; H01R 39/02; Y02E 10/72

USPC .......................................................... 310/168
See application file for complete search history.

(56) References Cited

U.S. PATENT DOCUMENTS

| | | | | |
|---|---|---|---|---|
| 3,238,523 A * | 3/1966 | Vrabel | .................... | H03M 1/00 341/15 |
| 4,238,781 A * | 12/1980 | Vercellotti | ........... | G01D 5/2412 324/683 |
| 5,519,393 A * | 5/1996 | Brandestini | .............. | G01D 5/25 341/11 |
| 5,534,859 A * | 7/1996 | Meyer | .................. | G01D 5/2415 324/660 |
| 5,665,965 A * | 9/1997 | Durham, III | ............ | G01D 5/36 250/214 PR |
| 6,492,911 B1 * | 12/2002 | Netzer | ................. | G01D 5/2415 340/870.37 |
| 11,012,003 B2 * | 5/2021 | Ludois | .................... | H02N 1/002 |
| 2009/0284332 A1 * | 11/2009 | Moore | ................. | A61B 8/4461 333/24 C |
| 2013/0043762 A1 * | 2/2013 | Ludois | .................... | H02K 19/26 310/219 |
| 2021/0044182 A1 * | 2/2021 | Hagen | .................... | H01R 39/02 |
| 2021/0320569 A1 * | 10/2021 | Ludois | .................. | H01G 11/08 |
| 2022/0158529 A1 * | 5/2022 | Ludois | ................. | H02K 19/365 |

* cited by examiner

*Primary Examiner* — Ahmed Elnakib
(74) *Attorney, Agent, or Firm* — Boyle Fredrickson S.C.

(57) ABSTRACT

An electrical rotating machine provides an integrated capacitive encoder for control of the stator field and enabling any of reduced size, reduced rotational inertia, and lower cost. The same structure may also support capacitive plates for capacitive power transfer to the rotor.

20 Claims, 12 Drawing Sheets

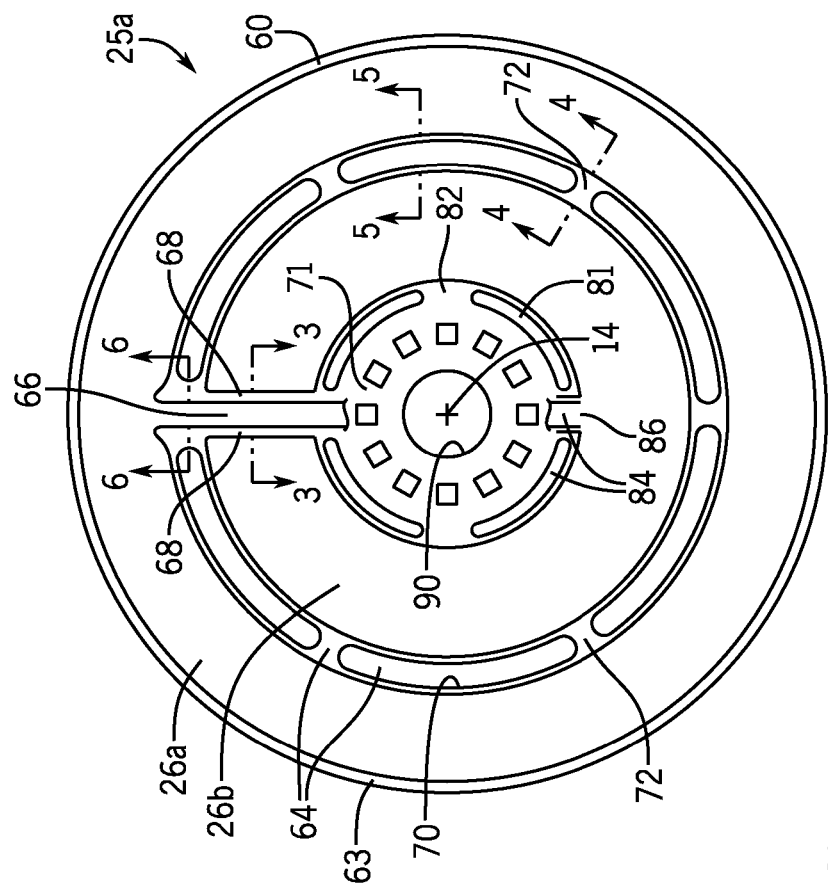
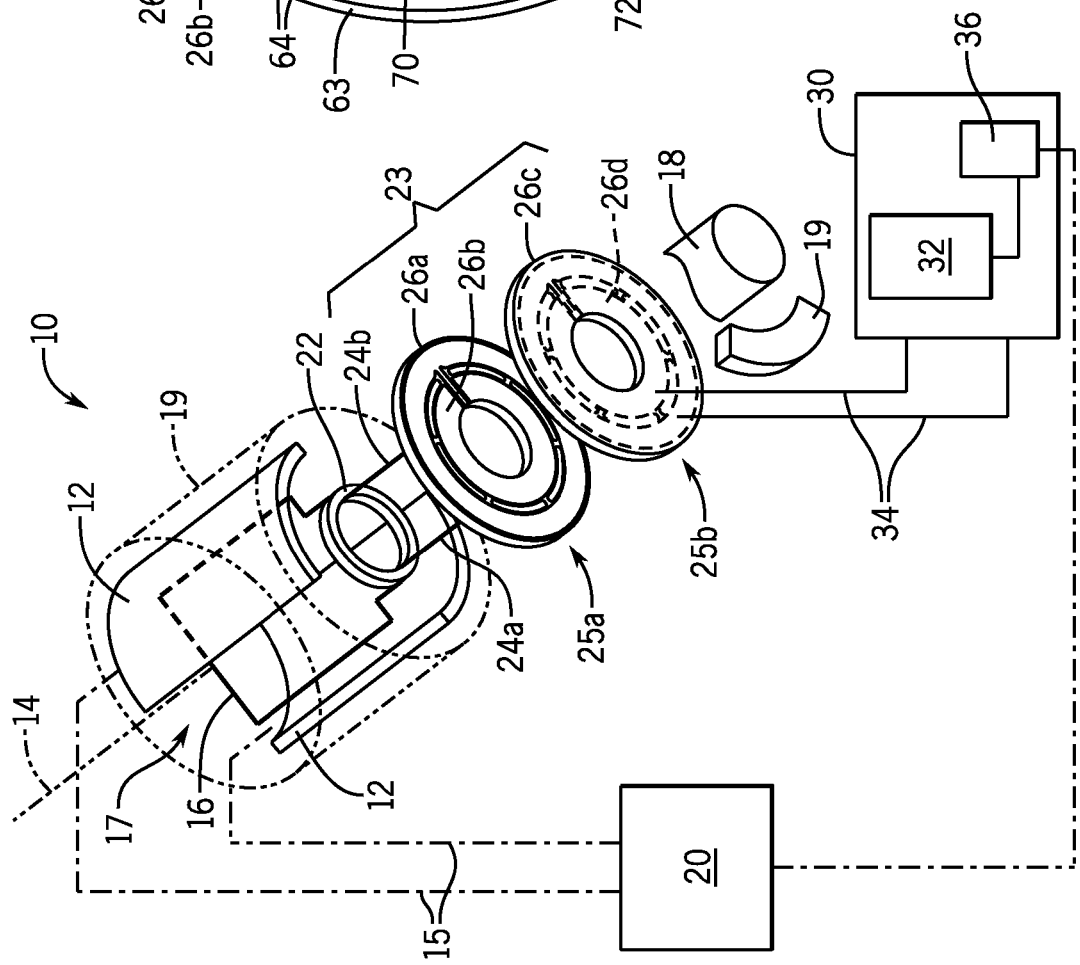
FIG. 2
FIG. 1

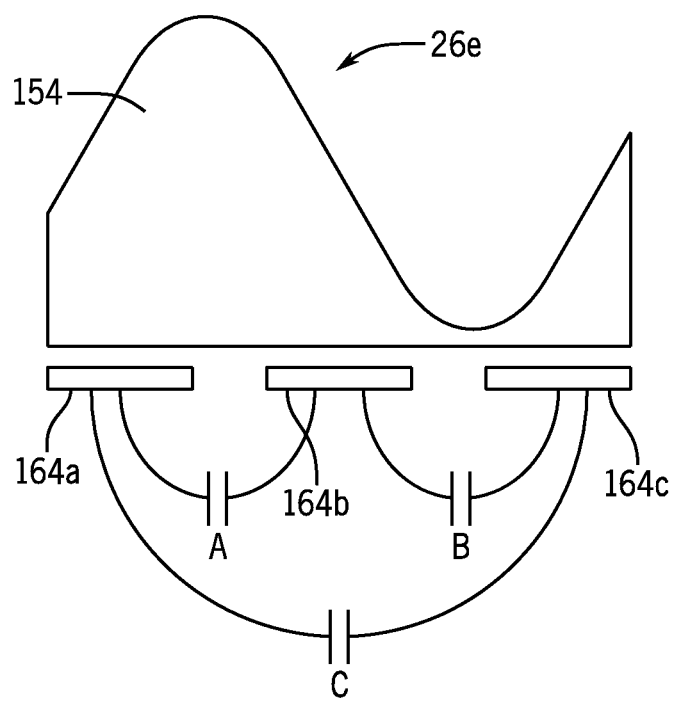
FIG. 12
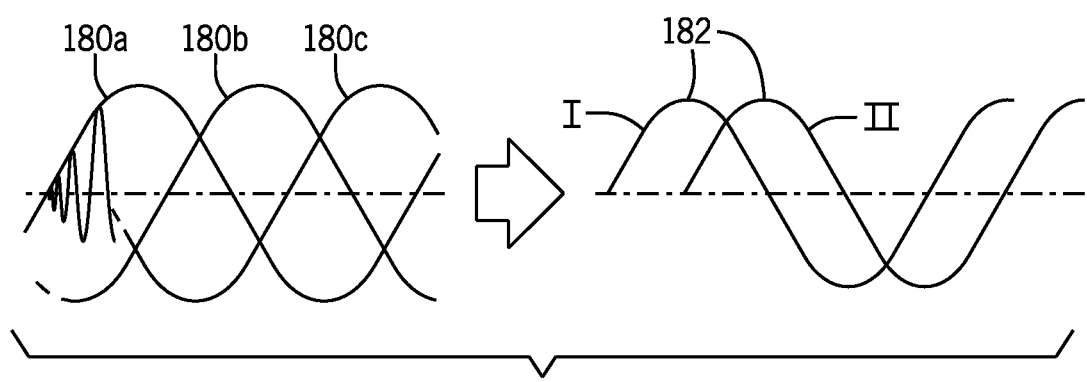
FIG. 13
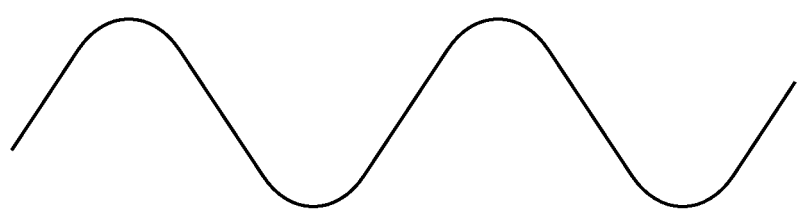

SINGLE SUBSTRATE RESOLVER/RECTIFIER FOR BRUSHLESS WOUND FIELD SYNCHRONOUS MACHINES

CROSS REFERENCE TO RELATED APPLICATION

This application is a continuation in part on U.S. application Ser. No. 16/534,735 filed Aug. 7, 2019, now U.S. Pat. No. 11,239,732, hereby incorporated by reference.

STATEMENT REGARDING FEDERALLY SPONSORED RESEARCH OR DEVELOPMENT

This invention was made with government support under DE-EE0008869 and DE-EE0007798 awarded by the US Department of Energy. The government has certain rights in the invention.

BACKGROUND OF THE INVENTION

The present invention relates to wound field synchronous machines electrical motors and generators) and in particular to a combined rotational encoder and rectifier assembly for a wound field synchronous machine.

Electrical motors and generators share similar structures of a magnetically interacting stator and rotor and may be collectively termed "electrical rotating machines." Electrical rotating machines employing permanent magnets for the rotor are termed permanent magnet synchronous machines (PMSM) and are popular in high-volume traction applications (e.g., motor drives for hybrid vehicles) and for compact electrical generation (e.g., generators used in wind turbines) because of their high torque density and efficiency.

The permanent magnets in PMSMs typically use rare earth materials of a volatile supply chain and whose extraction and refinement may inflict detrimental effects on the environment. For this reason, wound field synchronous machines (WFSM), using an electrical coil in place of the permanent magnet on the rotor, have received renewed attention. WFSMs have equal to lower torque density in comparison to PMSMs but, by permitting control of the rotor field directly, allow more sophisticated motor control, for example, permitting a high-power factor throughout the machine operating range of different operating speeds and torques. The ability to control the rotor field also permits improved handling of faults by allowing back EMF to be controlled (by removing the field current).

Power may be provided to the rotor of a WFSM, for example, using slip rings (brushes) or through a coupling of AC power (brushless), for example, inductively through transformers or the like or by capacitive coupling. Examples of WFSM's using capacitive power coupling are found in U.S. Pat. No. 9,692,279, entitled Wound Field Rotating Machine with Capacitive Power Transfer, and U.S. Pat. No. 10,381,871, entitled High Power Transfer through Load-Supporting Bearings, both assigned to the assignee of the present invention and incorporated by reference. Brushless WFSM's eliminate the problems of wear and contamination associated with brush systems but require a rectifier assembly on the rotor to rotate with the rotor and convert the AC power to DC power necessary for the rotor windings.

Synchronous machines such as WFSMs also require a system for sensing the position of the rotor shaft. This rotor position information is used to control the stator windings to properly synchronize a driving rotating magnetic field from the stator with the rotor position. Commonly such sensor systems include both mechanical position sensors such as encoders that rotate with the rotor shaft and so-called sensorless systems that deduce rotor position by analyzing the voltage and current of the stator winding modified by rotor salience, back EMF, or the like.

SUMMARY OF THE INVENTION

The present invention provides an improved wound field synchronous machine incorporating the rectifier assembly and capacitive encoder into a single support structure providing an opportunity for reduced cost and rotational inertia of the rotor. The capacitive encoder provides for a form factor readily adapted to optional capacitive power coupling.

More specifically, in one embodiment, the invention provides an electrical rotating machine having a stator for providing a magnetic field and a rotor mounted for rotation about a rotor axis with respect to the stator and including at least one electrical coil having a coil axis with a component perpendicular to the axis. A brushless AC power coupler communicates AC power to the rotor from a source stationary to the stator, and a capacitive encoder provides an opposed stationary and rotational support separated by a gap with the rotational support mounted to the rotor and the stationary support stationary to the stator, each of the stationary and rotational supports having respective opposed electrical plates having a capacitive coupling adapted to provide a rotation signal indicating rotation of the rotor with respect to the stator. A rectifier assembly is held on the rotational support communicating electrical power between the brushless AC power coupler and the electrical coil.

It is thus a feature of at least one embodiment of the invention to greatly simplify and potentially reduce the cost, rotational inertia, and size of a wound field brushless motor by integrating the rectifier assembly to a capacitive encoder for deducing rotor position. The capacitive encoder provides a form factor readily adaptable to a rectifier carrier.

The rotation signal may indicate a unique absolute position of the rotor with respect to the stator over 360° of rotation of the rotor with respect to the stator.

It is thus a feature of at least one embodiment of the invention to absolute position for the purpose of Field Oriented Control of the machine.

The rotation signal may indicate the unique absolute position of the rotor both when the rotor is stationary with respect to the stator and when the rotor is moving with respect to the stator.

It is thus a feature of at least one embodiment of the invention to provide a rotor position signal that can operate, for example, during startup of the rotor when there is no or little rotor motion.

The support may be a plate extending symmetrically about the rotor axis in a plane perpendicular to the rotor axis.

It is thus a feature of at least one embodiment of the invention to provide a simple support structure resistant to forces of outward acceleration caused by rotation of the rotor yet providing for closely spaced capacitor plates on the rotating and stationary support.

The plate may be a composite fiber polymer material having conductive traces forming a capacitive plate of the capacitive encoder and electrical interconnections between the rectifiers of the rectifier assembly.

It is thus a feature of another embodiment of the invention to provide a simple manufacturing technique that can make use of common printed circuit board materials and techniques.

The electrical plate on the rotational support may have a variable radial extent causing a periodic variation in capacitance between the electrical plate on the rotational support and at least one electrical plate on the stationary support as a function of rotational position of the rotor with respect to the stator.

It is thus a feature of at least one embodiment of the invention to provide a capacitive encoder that can use a constant gap between electrodes for simplified construction.

The opposed stationary and rotational supports may further include opposed second electrical plates operating together to conduct electrical power capacitively from the stationary support to the rectifier assembly on the rotational support.

It is thus a feature of at least one embodiment of the invention to use the same structure as that which provides support for the rectifier assembly and the capacitive encoder for power transfer to the rotor windings.

The electrical rotating machine may further provide a power source providing AC power through a circuit including the first and second electrical plates, the rectifier assembly, and the electrical coil.

It is thus a feature of at least one embodiment of the invention to combine the functions of the plates of the capacitive encoder and power transfer for improved space efficiency.

Alternatively the electrical rotating machine may further include third electrical plates operating together with the second electrical plates to conduct electrical power capacitively from the stationary support to the rectifier assembly on the rotational support.

It is thus a feature of at least one embodiment of the invention to provide separate electrodes for the capacitive encoder and power transfer, for example, providing greater flexibility in using different signals for power transfer and capacitive measurement.

The capacitive encoder may include a drive circuit providing a first and second encoder signal with a first phase and second different phase respectively; and the capacitive encoder may further include at least two pairs of opposed electrical plates on respective of the stationery and rotational support, the first opposed electrical plates of each pair conducting the first signal and the second opposed electrical plates of each pair conducting the second signal. In addition the electrical rotating machine may further include a decoder circuit monitoring capacitive coupling and signal phase of the first and second encoder signals to provide the rotation signal indicating a unique position of the rotor with respect to the stator over 360° rotation of the rotor with respect to the stator.

It is thus a feature of at least one embodiment of the invention to provide a way of distinguishing rotor positions offset by a pole angle.

The first and second encoder signals may have 180° of phase difference.

It is thus a feature of at least one embodiment of the invention to provide a simple encoder signal that can allow the encoder signal to use a power signal to the rotor where such a phase difference can be readily produced.

The rectifier assembly maybe positioned near a center of the rotational plate about the rotational axis with respect to the electrical plates which are positioned near an edge of the rotational plate away from the rotational axis with respect to the rectifier assembly.

It is thus a feature of at least one embodiment of the invention to move the mechanically robust plates to an outer edge of the support structure allowing them to have greater area while protecting the rectifiers from undue accelerative force.

The opposed electrical plate on the stationary support may provide a set of plate elements independently sensing capacitive coupling to the opposed electrical plate on the rotational support, and the number of plate elements maybe 3N where N is the number of poles of the rotating machine so as to provide a three-phase rotation signal.

It is thus a feature of at least one embodiment of the invention to provide a three-phase rotation signal compatible with existing motor control technologies.

These particular features and advantages may apply to only some embodiments falling within the claims and thus do not define the scope of the invention.

BRIEF DESCRIPTION OF THE FIGURES

FIG. 1 is a simplified diagram of a fixed-gap wound field electrical machine of the present invention providing a wound field rotor coil attached via capacitive coupling disks to drive electronics for providing high-frequency AC power;

FIG. 2 is front elevational view of a capacitive coupling disk attached to the rotor showing an inner and outer annular capacitor ring for conducting two separate electrical phases and showing slots between the annular capacitor rings and between the inner capacitor ring and on-board circuitry for reducing dielectric losses and depicting a radial conductor allowing the drive electronics at the center of the disk to communicate with both the inner and outer capacitor ring;

FIG. 12 is a diagrammatic view of the capacitive coupling between the plates of the capacitive encoder of FIG. 11 showing capacitance measurements for deriving a rotation signal;

FIG. 13 is a plot of the signals obtained from the capacitive encoder of FIGS. 11 and 12 and showing a Clarke transform operating on a modulation envelope of the signals which provides quadrature signals indicating rotation and direction;

DETAILED DESCRIPTION OF THE PREFERRED EMBODIMENT

Figure 3:
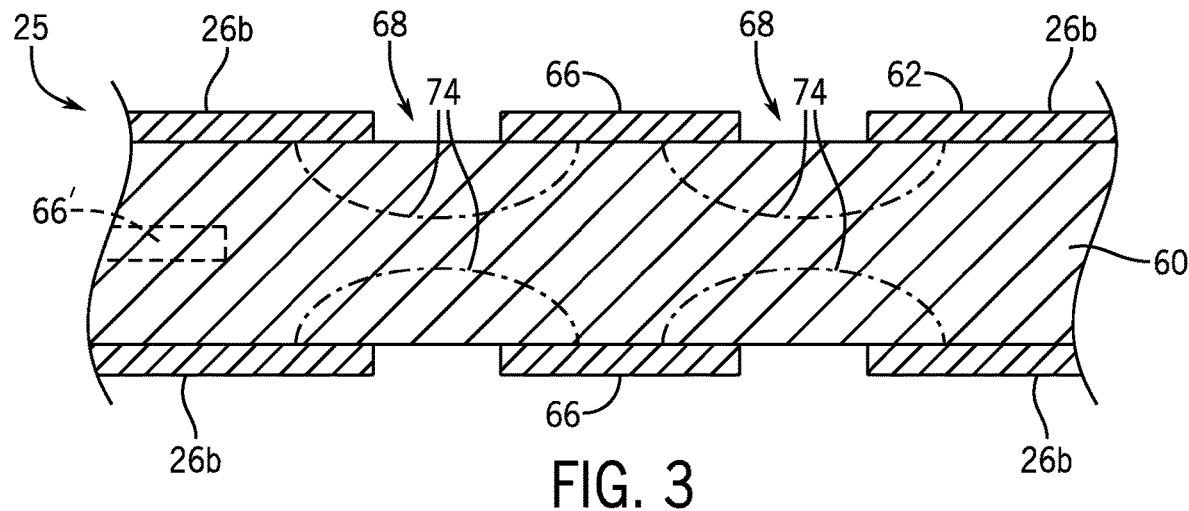
FIG. 3 is a cross-section taken along line 3-3 of FIG. 2 showing regions of high field strength that are reduced by nonoverlapping construction of the radial conductor and the inner and outer capacitor rings resulting in a corresponding reduction in dielectric loss.

I. Combination Capacitive Power Coupler and Diode Array

Referring now to FIG. 1, a wound field synchronous machine 10 configured as a motor may include stationary stator windings 12 opposed across a motor axis 14 and generating a rotating magnetic field crossing the motor axis 14.

A rotor 17 is positioned between the stator windings 12 and provides a rotor coil 16 wound about an axis that rotates generally perpendicularly to the axis 14. For clarity, only a single "turn" of the rotor coil 16 is shown; however, it will be understood that typically the rotor coil 16 will comprise many turns of a conductor such as copper wire formed in one or more loops. Also only a single rotor pole pair is shown, and multiple rotor poles may be used. Generally, the rotor coil 16 will be supported on additional structure of the rotor 17 which may be either non-ferromagnetic or ferromagnetic to concentrate the magnetic flux generated by the rotor coil 16.

The rotor 17 may turn about the axis 14 as attached to a shaft 18 supported for rotation about axis 14 on bearings (not shown) supported by a motor housing 19 shown in fragment.

Electric current may be provided to the rotor coil through a capacitive coupling unit 23 as will be described in more detail below. The current through the rotor coil 16 will generate a magnetic field according to principles well known in the art, the magnetic field directed generally perpendicularly to the motor axis 14 and rotating with rotation of the rotor coil 16.

As is generally understood in the art, the stator windings 12 may be energized by a stator winding control unit 20 which controls the amplitudes of stator polyphase currents 15 and thus the direction of the field extending between stator windings 12 to promote an angular torque on the rotor coil 16 causing rotation of the rotor 17 and the shaft 18. The switching of current through the stator windings 12 to create this torque may be done "open loop" without knowledge of the state of the rotor 17, or by means of position or velocity feedback in which the state of the rotor 17 is monitored as a feedback signal using a position or velocity sensor such as an encoder or resolver of conventional design (not shown) or a position sensing technique of the present invention to be described below.

Generally, the conductors of the rotor coil 16 may attach to a rotor power processing circuitry 22 which provides a current to the rotor coil 16 from AC current conductors 24a and 24b providing inputs to the rotor power processing circuitry 22. The rotor power processing circuitry 22 may be, for example, a full-wave rectifier employing solid-state diodes of conventional design and may be mounted to rotate with the rotor coil 16 on the shaft 18 which may include impedance matching circuitry as will be discussed below.

Each of AC current conductors 24a and 24b may in turn receive power from the capacitive coupling unit 23 where they are connected to a first coupler capacitor disk 25a being part of the capacitive coupling unit 23. The front side of the first coupler capacitor disk 25a supports two annular capacitor plates 26 including annular capacitor plate 26a closest to the periphery of the first coupler capacitor disk 25a and annular capacitor plate 26b concentrically within annular capacitor plate 26a on the first coupler capacitor disk 25a. As will be discussed below, the reverse side of the first coupler capacitor disk 25a (not shown in FIG. 1) will provide corresponding plates 26 in the mirror image of the front side. The coupler capacitor disk 25a is physically attached to the rotor 17 to rotate therewith about motor axis 14.

A second coupler capacitor disk 25b of the capacitive coupling unit 23 is generally stationary with respect to the stator windings 12, for example, attached to a housing 19 supporting the bearings holding the shaft 18 for rotation. The rear side of the second coupler capacitor disk 25b facing the first capacitor disk 25a supports two annular capacitor plates 26 including annular capacitor plate 26c (corresponding in area and disk location with capacitor plate 26a and axially aligned with capacitor plate 26a) and annular capacitor plate 26d (corresponding in area and disk location with capacitor plate 26b and axially aligned with capacitor plate 26b). Again, the reverse or front side of the second coupler capacitor disk 25b will provide corresponding plates 26 (not shown in FIG. 1) in the mirror image of the rear side of the second coupler capacitor disk 25b.

Figure 7:
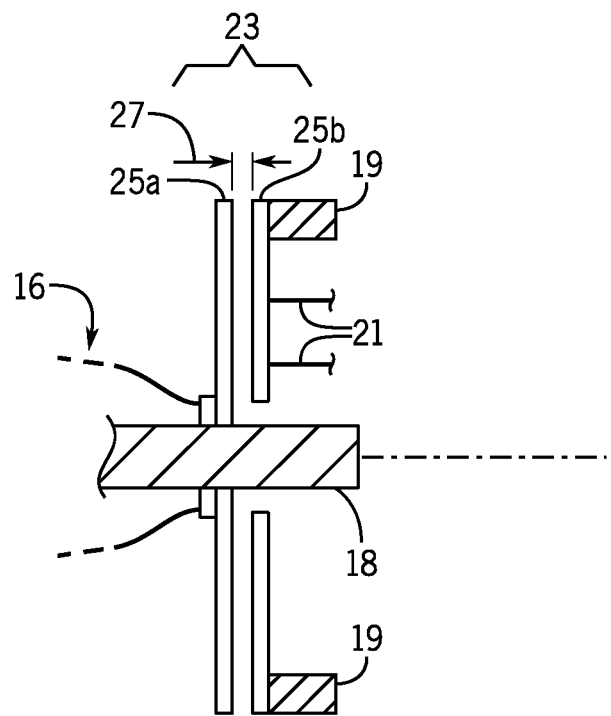
FIG. 7 is a side view of the capacitive coupling disks showing alternative access wiring for a stationary plate eliminating the radial conductor and the gap between the plates during operation.

Referring momentarily to FIG. 7, as noted, the first coupler capacitor disk 25a is attached to shaft 18 to rotate therewith and extends radially in a direction perpendicular to axis 14. The second coupler capacitor disk 25b does not connect to the shaft 18 but rather to a stationary frame or motor housing 19 so as not to rotate with shaft 18 but also extends radially in a direction perpendicular to axis 14, parallel to first coupler capacitor disk 25a with a separation distance 27 from the first coupler capacitor disk 25a as much as 5 mm but typically 1 mm and desirably more than $\frac{1}{10}$ of a millimeter. Generally this separation distance 27 is mechanically fixed.

Referring again to FIG. 1, capacitor plates 26c and 26d are attached in turn to drive electronics 30 providing AC power to the capacitor plates 26c and 26d. Generally, as will be described in more detail below, the drive electronics 30 may include a solid-state inverter 32 for generating the AC signals on lines 34 at a controllable frequency from a DC source. The drive electronics 30 may be associated with monitoring circuitry 36 which may monitor the drive electronics 30 and/or the AC signal on lines 34 to deduce motor parameters such as velocity and rotor position, as will be described below.

Referring now to FIGS. 2 and 3, the first coupler capacitor disk 25a may be constructed of a rigid dielectric material 60 clad with a metal 62 such as copper, the latter typically in a thickness from 0.7 mils to 2.8 mils that may be chemically etched according to standard integrated circuit fabrication processes. The dielectric material 60 may, for example, be an FR4 material having a dielectric constant $e_r$ of 4.4 or may be a material such as RO4000 (also known as Rogers material commercially available from the Rogers Corporation of Chandler Arizona) having a dielectric constant $e_r$ of 3.38. These materials are composites of glass fiber and other materials including polymers and in some cases ceramics. Desirably the dielectric constant (relative permittivity) of this the dielectric material 60 will be less than five to reduce dielectric losses. The dielectric material 60 may have an axial thickness of 1/32 inch to 1/4 inch although other thicknesses are contemplated.

The outer capacitor plate 26a may be a substantially continuous ring of metal on opposite faces of dielectric material 60 inset by a slight margin 63 from the periphery of the capacitor disks 25 to assist in machining of the capacitor disks 25 into a circular shape. The outer capacitor plate 26a is separated from the inner capacitor plate 26b by a gutter region 64 free of metallic conductors with the exception of a single inwardly radially extending conductor bus 66 passing from the outer capacitor plate 26a through flanking gaps 68 in the inner capacitor plate 26b to a central circuit region 71 concentrically inside of the inner capacitor plate 26b holding the rotor power processing circuitry 22 such as a rectifier assembly (for motor) or an inverter circuit or the like (for a generator). The gutter region 64 is not only free of the copper cladding of metal 62, such as separate separates capacitor plates 26a and 26b, but includes arcuate slots 70 cutting fully through the dielectric material 60 to remove the dielectric material completely in the region of the slots 70. In order to provide mechanical support for the capacitor plate 26a and its underlying dielectric material 60, the slots 70 are arcuately spaced apart by narrow, radially extending struts 72 within the gutter regions 64 where the dielectric material 60 is not removed but is nevertheless free from metal 62. Generally, the slots 70 will extend over an arc length that is at least five and preferably more than 10 times the arc length of the struts 72 to minimize dielectric material 60 between the capacitor plates 26a and 26b.

Figure 4:
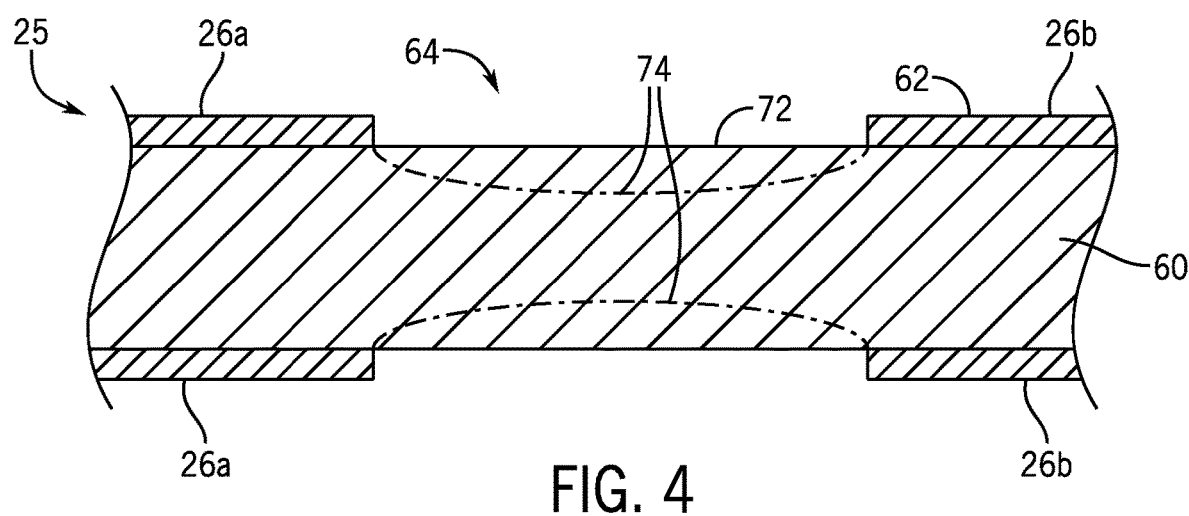
FIG. 4 is a cross-section taken along line 4-4 of FIG. 2 showing regions of high field strength at supporting struts between the inner and outer rings minimized by the relatively small area of the supporting struts.

Referring now to FIG. 4, the gutter region 64 at the struts 72 will experience regions of high electrical field 74 between the capacitor plates 26a and 26b on the front and rear surface of the capacitor disk 25a. These regions of high electrical field 74 pass into the dielectric material 60 causing dielectric loss in the dielectric material 60 increasing losses in power transfer through the capacitive coupling unit 23. The present invention reduces this dielectric loss, however, by minimizing the size of the struts 72 compared to the slots 70.

Figure 5:
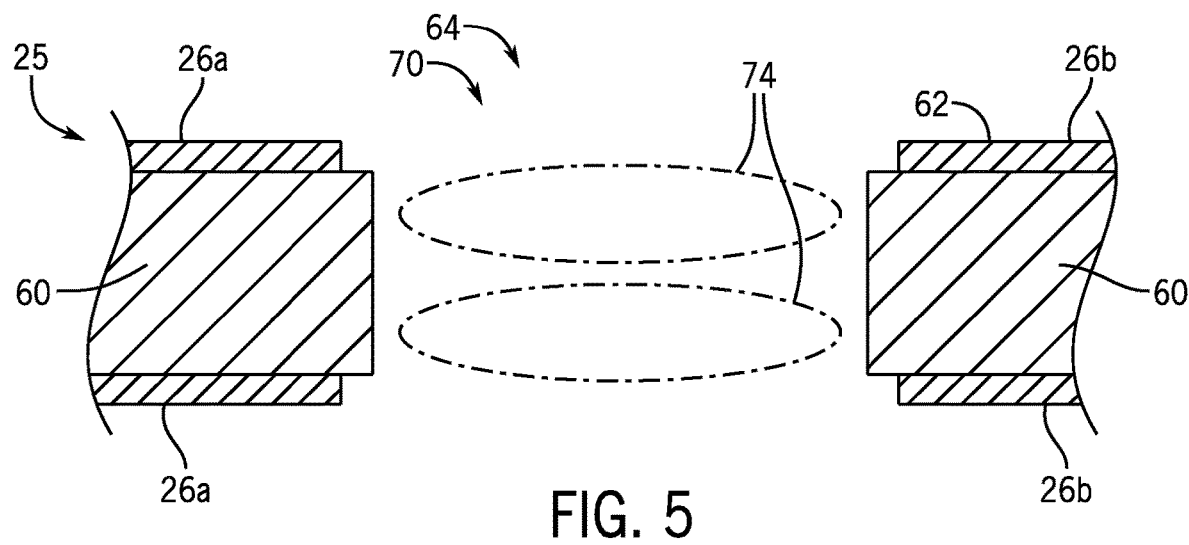
FIG. 5 is a cross-section taken along line 5-5 of FIG. 2 showing the effect of slots in reducing high field strength in dielectric regions compared to that of FIG. 3 thus reducing in dielectric loss.

In contrast, and as shown in FIG. 5, in the region of the slots 70, the dielectric material 60 is removed so that the regions of high electrical field 74 occur in extremely low dielectric regions of air (or potentially a vacuum) both approximating a dielectric constant value of 1. The slots 70 thus greatly reduce dielectric loss at high frequencies and high voltages.

Referring to FIG. 3, a similar approach is used with respect to the conductor bus 66 as it passes through the conductive capacitor plate 26b separated by gaps 68. While again regions of high field 74 occur in the dielectric material 60 between the conductor bus 66 and the conductive capacitor plate 26b, this field strength is greatly reduced over, for example, what would occur if the conductive bus were embedded in the dielectric material 60 beneath the material of the plate 26b (shown by phantom bus 66') per normal integrated circuit practice of multilayer printed circuit board manufacture. The closer proximity of the bus 66' in that case would result in higher field strengths and hence greater dielectric loss.

Figure 6:
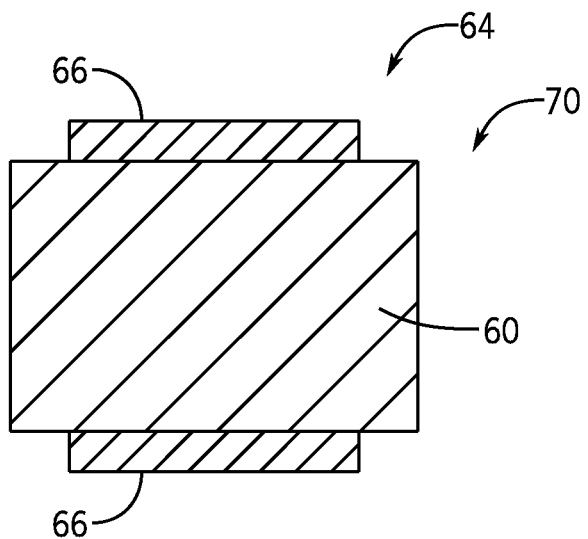
FIG. 6 is a cross-section taken along line 6-6 of FIG. 2 showing elimination of the dielectric at the point where a radial conductor passes from the outer ring to the inner ring greatly reducing dielectric loss.

Note as shown in FIG. 6, that in the gutter region 64, the bus 66 may be essentially completely isolated from capacitor plates 26a or 26b by the slots 70.

By reducing the proximity of the conductors and the presence of supporting dielectric material between conductors, the invention has provided a reduction in equivalent series resistance between the power supply and the rotor through the capacitive coupling unit 23 from approximately 6.6 ohms to approximately 1.9 ohms when operated with AC power at 2.0 MHz.

Referring again to FIG. 2 the central circuit region 71 may support rotor power processing circuitry 22, for example, providing for power rectification and impedance adjustment. This rotor power processing circuitry 22 may be assembled to the dielectric material 60 and connected by conductive traces of the same material of the capacitor plates 26a and 26b per normal printed circuit board fabrication process. The rotor power processing circuitry 22 may be generally laid out to provide a balanced rotational inertia about axis 14; however, the positioning of the rotor power processing circuitry 22 close to the center of the capacitor disk 25a and the lightweight nature of the solid-state components of such rotor power processing circuitry 22 greatly reduces accelerated forces that might unbalance the capacitor disk 25a.

Centered in the capacitor disk 25a is a circular opening 90 to allow it to receive the shaft 18 and attach to the shaft 18 by means of a collar or the like.

The central circuit region 71 holding the rotor power processing circuitry 22 may be isolated from capacitor plate 26b by a set of slots 81 and struts 82 in a gutter region 84 generally analogous to the isolation between capacitor plate 26a and 26b discussed above. This gutter region 24 is devoid of overlying conductive metal 62 except for the passage of bus 66 described above which is received by the rotor power processing circuitry 22 and a conductor tab 86 passing into the region of the rotor power processing circuitry 22 from the capacitor plate 26b. The bus 66 and conductor tab 86 provide the conductors 24a and 24b discussed above.

The front and rear sides of the capacitor disk 25a are mirror images with respect to the layout of the metal 62 on the front and rear surfaces of the dielectric material 60 except for the rotor power processing circuitry 22 which may only be on the reverse side of the capacitor disk 25a so as to not interfere with the tight clearance from the separation distance 27 between the capacitor disks 25a and 25b shown in FIG. 7. It will be appreciated, however, that the invention is not limited to one pair of disks 25a and 25b but that multiple pairs of disks may be cascaded along the shaft 18. Further, the power processing circuitry 22 may be reduced in height (for example by direct die bonding or recesses in the printed circuit board material) so that a given capacitor disk 25a may be flanked by a pair of capacitor disks 25b and vice a versa so that both sides of the flanked disks 25 may contribute to power transfer.

The construction and front and rear sides of the capacitor disks 25b may be identical to that of capacitor disk 25a with the exception of the rotor power processing circuitry 22 which is not required and the conductive bus 66 and conductor tab 86 which may be replaced by perpendicular conductors 21 shown in FIG. 7. Generally, the opening 90 in capacitor disk 25b will be larger than in capacitor disk 25a to allow clearance around the shaft 18 because capacitor disk 25b is stationary. The shaft 18 may pass through capacitor disk 25b to be supported by a bearing or the like for reduced play.

Desirably, the capacitance between capacitor plates 26a and 26c will be identical to the capacitance between capacitor plates 26b and 26c. This inequality is intuitively provided by ensuring that the area of each of these plates is the same under the assumption that the separation distance 27 is the same. The present inventors, however, have recognized that the effective area of the capacitor plates 26 is larger than their physical area because of fringe fields. As a result, optimally the area of metal 62 of capacitor plate 26a is desirably smaller than the area of metal 62 of capacitor plate 26b (and likewise with capacitor plates 26c and 26d) according to the equation (1):

$$A_{effective} = \pi(r_{outer}+g)^2 - \pi(r_{inner}-g)^2. \quad (1)$$

where $A_{effective}$ for capacitor plate 26a (or 26c) is set to be equal to the value of $A_{effective}$ for capacitor plate 26b (or 26d) and wherein $r_{outer}$ and $r_{inner}$ are the inner and outer radius of each ring of capacitor plate 26a (or 26c) and 26b (or 26d), respectively, adjusted for the (area of bus 66 and surrounding gaps 68), and wherein the value of g is the distance by which fringing fields extend laterally from the capacitor plates 26 such as may be determined empirically or by computer modeling.

Figure 8:
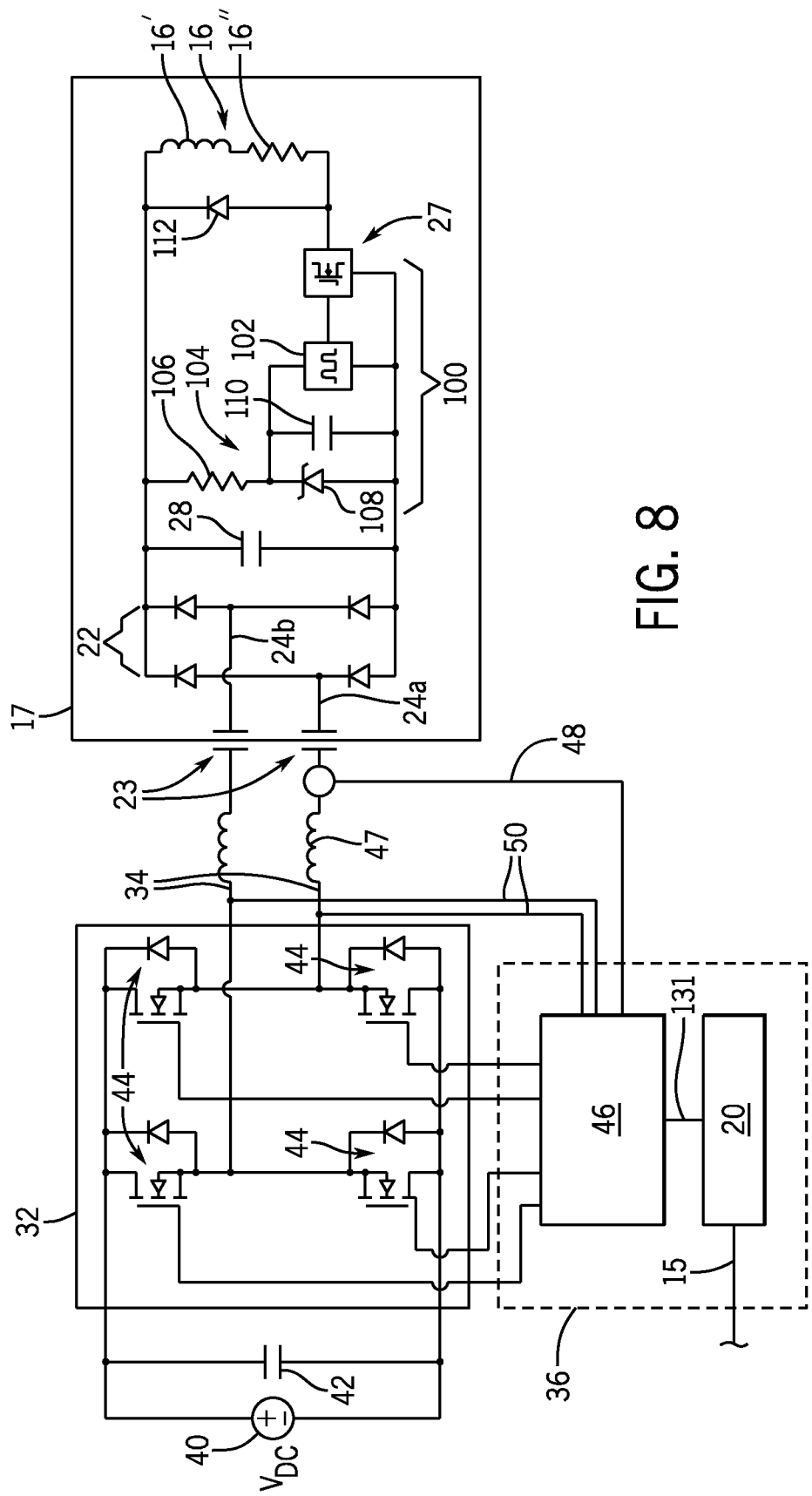
FIG. 8 is a schematic of drive electronics and rotor electronics that may be used in the present invention.

Referring now to FIG. 8, the inverter 32 used to provide power to the capacitive coupling unit 23 may comprise a standard H-bridge array of transistors 44 receiving a source of DC power 40 filtered by filter capacitor 42 and operating to switch the polarity of application of the DC power to an output providing the AC signals on lines 34. Other synthesizing circuits known in the art may also be used including half bridges, push-pull stages, etc. The fundamental frequency of the AC signal on lines 34 is desirably above 1 and desirably as high as 13.56 megahertz or higher to greatly reduce the necessary capacitance of the capacitive coupling unit 23 for a given amount of transmitted power. Likewise the voltage of the AC signal on lines 34 may be in excess of 100 V and in some cases in excess of 500 V to provide transmitted powers in excess of 1 kW or in excess of 50 kW. It will be understood that the shown MOSFET transistors may be high-speed silicon carbide or gallium nitride MOSFET transistors for effective megahertz operation. Standard antiparallel diodes are provided for each transistor 44.

The gates of the switching transistors 44 are controlled by a switch logic circuitry 46 according to normal bridge switching functions and will be discussed below. The switch logic circuitry 46 may optionally receive a current signal 48 monitoring the current of the AC signals on lines 34 and a voltage signal 50 monitoring the voltage of the AC signal across lines 34. It will be understood the current sensing and voltage monitoring could be performed at a variety of other locations. For example, the current sensing could occur at the DC bus (in series with one of the lines spanned by capacitor 42), and the voltage sensing may not be required in certain circumstances or may be inferred from knowledge of the voltage of the DC bus and the switching pattern of the transistors 44.

Referring still to FIG. 8, electrical power from the AC signal on lines 34 will be transferred through the capacitive coupling unit 23 to be received by a rotor power processing circuitry 22 and from the rotor power processing circuitry 22 to the rotor coil 16. As shown, the rotor coil 16 is electrically represented by an inductance 16' of the rotor coil 16 and rotor coil resistance 16" of the rotor coil 16.

The rotor power processing circuitry 22 may consist of four solid-state semiconductor diodes, preferably silicon carbide Schottky diodes, arranged in a full wave rectifier configuration and followed by a filter capacitor 28, as is generally understood in the art, to convert the high frequency AC signal on lines 34 to a DC voltage to power the rotor coil 16. It will be appreciated that other rectifier configurations may also be used including a halfway rectifier voltage doubler, current doubler, or voltage multiplier (Cockroft-Walton circuit).

In one embodiment, DC power from the filter capacitor 28 passes through an impedance matching circuit 100 to provide better energy transfer to the rotor coil 16 according to the maximum power transfer theorem. In this case, the high-voltage on lines 34 preferable for power transfer through the capacitive coupling unit 23 is not well matched to the low impedance of the rotor coil 16 and impedance dictated by the use of heavy gauge copper wires in the rotor coil 16 for improved mechanical resilience and low electrical resistance. Accordingly this high-voltage after conversion to DC is reduced by the impedance matching circuit 100. This reduction in voltage and corresponding increase in current impedance may take a variety of forms making use of a matching transformer using the turn ratio between a primary and secondary coil for the conversion. Alternatively, impedance matching circuit 100 may provide a "buck converter" that "chops" the current applied to the rotor coil 16 from the capacitor 28 at a controlled duty cycle ratio to produce an effectively lower average voltage. The buck converter, for example, may provide a square wave oscillator 102 scavenging with power from the capacitor 28 and using a lightweight power supply 104 formed by series connected resistor 106 and Zener diode 108. The resistor 106 is connected to a positive side of the DC power across capacitor 28 and the anode of the Zener diode 108 to the negative side of the DC power across capacitor 28. The junction of the resistor 106 and Zener diode 108 communicates with a secondary filter capacitor 110 which provides power to the oscillator 102. The oscillator may be a variety of designs, for example, using an integrated circuit 555 timer well known in the art. The output of the oscillator 102 provides a signal to a transistor assembly that controls current passing through the rotor coil 16 according to the duty cycle ratio of the waveform produced by the oscillator 102. By reducing the duty cycle ratio, the average voltage across the rotor coil 16 is reduced while additional current can be drawn from the capacitor 28. A flyback diode 112 is provided across the rotor coil 16 to commutate the current resulting from the switching operation.

As noted, rotor power processing circuitry 22 and the impedance matching circuit 100 may be attached to the capacitor disk 25a discussed above or may be attached elsewhere on the rotor 17.

Referring still to FIG. 8, inductors 47 may be placed in series with the capacitor plates 26c and 26d to receive current from the inverter 32. These inductors 47, in series with the series capacitances of the capacitive coupling unit 23, present a series resonance at which the impedance to current flow from the inverter 32 through the rotor coil 16 is minimized. The switch logic circuitry 46 of the inverter 32 may accordingly be set so that the fundamental frequency of the AC signal on lines 34 is at the series resonance frequency in order to maximize energy transfer to the rotor coil 16 from the low output impedance inverter 32 and to permit desirable soft switching of the transistors 44.

Figure 9:
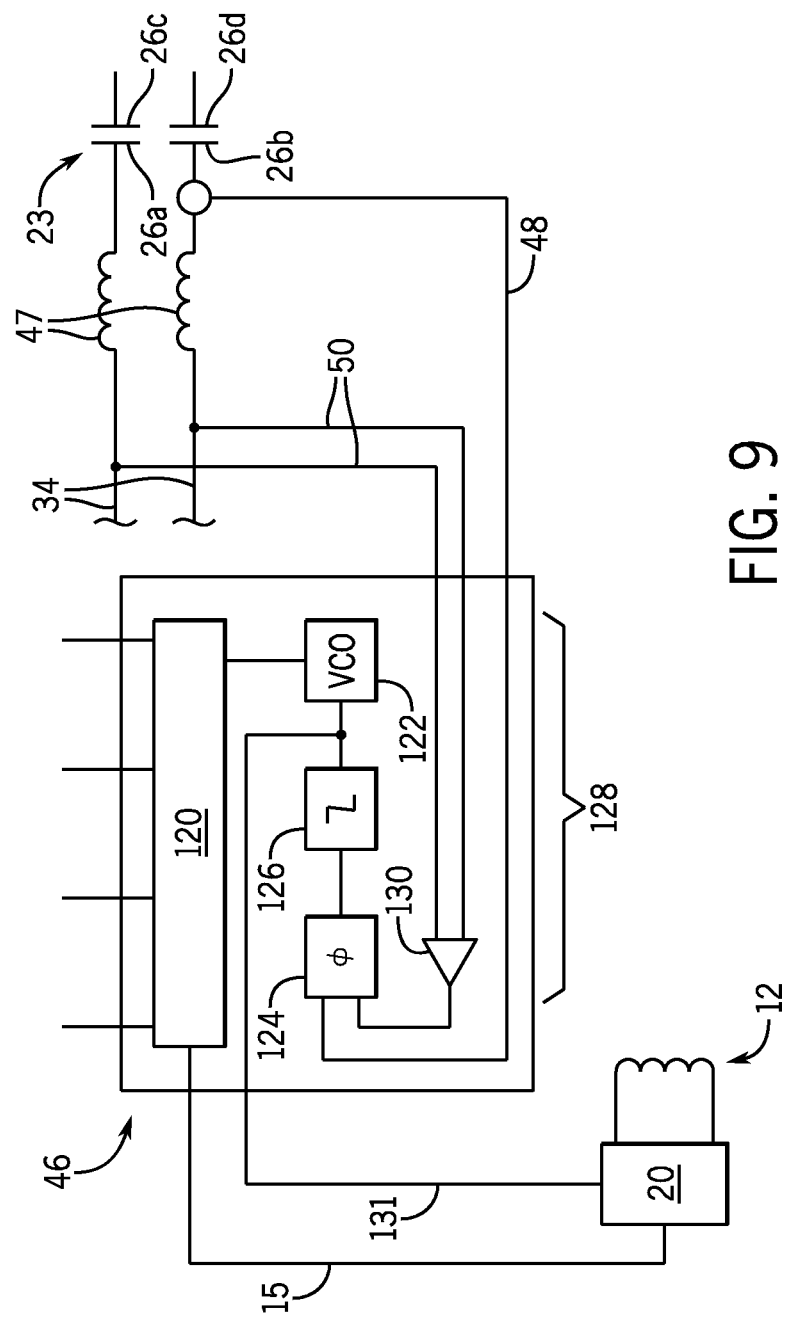
FIG. 9 is a detailed diagram of a portion of the drive electronics employing a phase locked loop for improved power transfer.

Referring now to FIG. 9, the switch logic circuitry 46, which provides switch state circuitry 120 that correctly sequences the control signals to the MOSFET transistors 44, may be controlled in switching frequency by a voltage controlled oscillator 122 being part of a phase locked loop 128. The voltage controlled oscillator 122 receives a signal from a low-pass filter 126 that in turn receives the output of a phase comparator 124, this output dependent on a phase error between the inputs of the phase comparator 124. A first input to the phase comparator 124 is current signal 48 and the second input to the phase comparator 124 is a voltage signal 50 taken across lines 34 and extracted by differential amplifier 130. Alternatively, the second input to the phase comparator 124 may be taken directly from the output of the voltage controlled oscillator 122 (see FIG. 9) to avoid the need to connect to high voltages of lines 34.

The error output from the phase comparator 124 serves to change the frequency of the voltage controlled oscillator 122 so that the phase of the current and voltage become matched, a state consistent with operation of the frequency of the AC power on lines 34 at the natural resonant frequency of the series connected capacitances and inductors 47. In this way, maximum power is transferred and soft switching of the transistors 44 may occur such as reduces transistor heating and energy loss. A phase locked loop circuit suitable for use with present invention can be realized by the widely available CMOS 4046 phase locked loop monitoring the phases of current and voltage using zero crossing detector circuitry.

Figure 10:
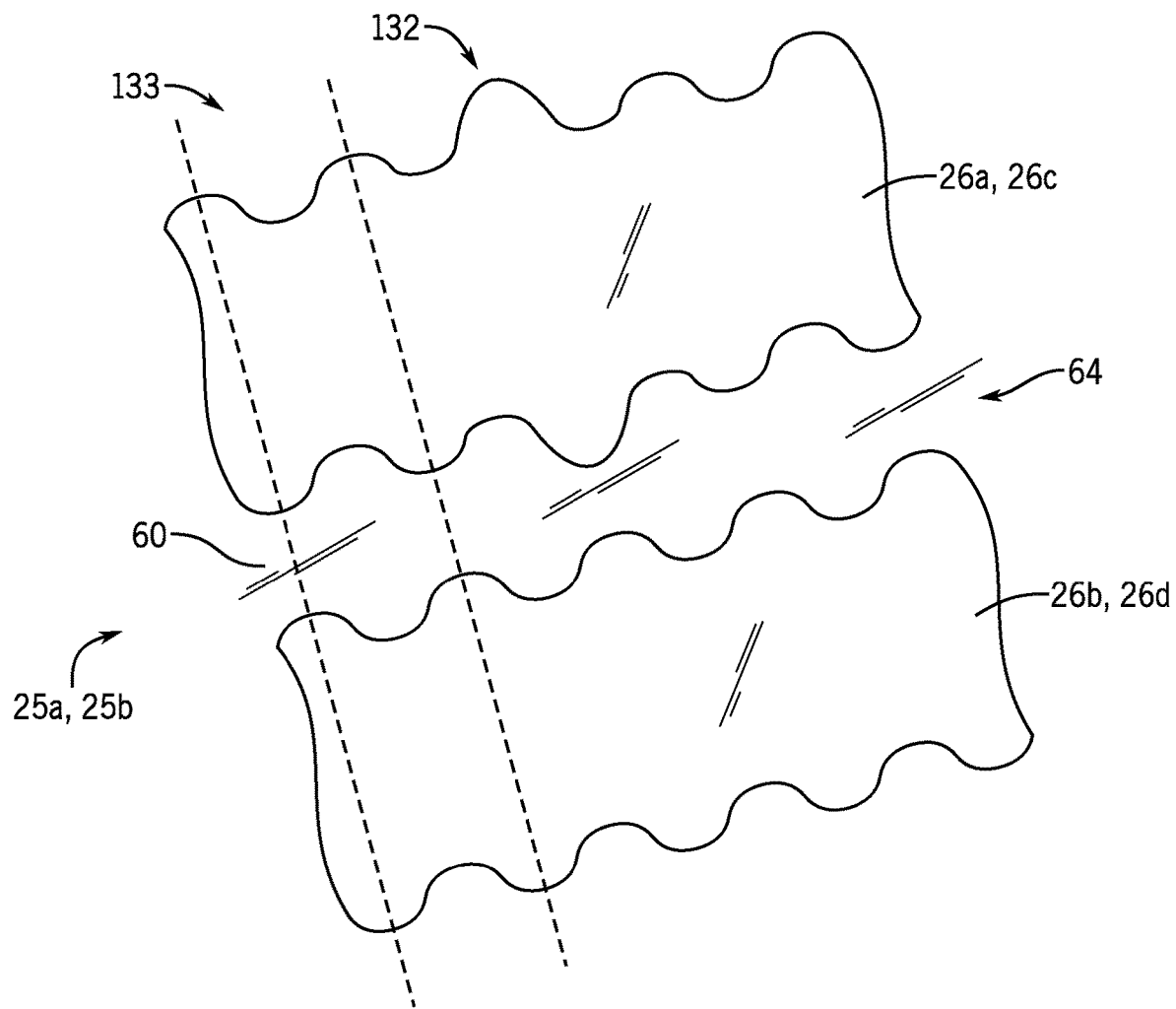
FIG. 10 is a fragmentary side view of the annular capacitor rings scalloped to provide a regular position signal through capacitive coupling.

The output 131 of the low-pass filter 126, such as indicates a phase error and reflects the frequency of operation of the VCO in tracking the natural resonance frequency, will have perturbations caused by minor changes in capacitive coupling in the capacitive coupling unit 23 as the rotor 17 rotates. These changes, for example, may reflect slight variation in the separation between the capacitor disks 25 from lack of perfect alignment or may be intentionally imposed, for example, as shown in FIG. 10 by adding scalloping 133 to the inner or outer diameters of the capacitor plates 26 causing regular capacitance fluctuations as these scallops rotate into and out of alignment. Desirably the scalloping 133 will be on a regular angular basis for both capacitor plates 26a and 26b and for both of the capacitor disks 25a and 25b to accentuate this perturbation for improved measurement. By measuring the perturbation, changes in rotational position and velocity of the rotor 17 may be determined without the need for a separate resolver or encoder. Direction may be obtained through the use of an additional set of plates 26 (for example concentric and outside of plates 26a-26d) that provide a signal that is 90° out of phase with the signals provided by plates 26a-26d. These auxiliary plates need not participate in power transfer and would therefore not need to be connected to the inverter 32 but would need access to a separate excitation signal (see below) for capacitance measurement. The 90° signal allows direction to be determined by simply looking at the relative phase of the two signals.

The scalloping may also be modified, for example, with a variation in one of the capacitor plates 26a and/or 26b (and in corresponding capacitor plates 26c and/or 26d) at a designated absolute angular position to provide increased or decreased capacitance outside of the normal scalloping 133 to create an absolute rotor position reference detectable, for example, by a local capacitive peak or trough outside of the capacitance amplitude excursions of the normal scalloping 133.

The output 131 may thus provide both a position signal of the rotor and a velocity of the rotor such as can be provided to a stator winding control unit 20 to control, for example, the voltage applied to the capacitive coupling unit 23, for example, by burst modulation to change the field winding currents to control motor speed range by field weakening. Burst modulation controls the gating of the transistors 44 "on" for a predetermined number of cycles, and then "off" for a predetermined number of cycles to control average field current. The energy storage property of the field winding inductance smooths the output current, provided that the repetition rate of the burst modulation is fast enough.

The same burst modulation can be used to sense rotor position to the extent that it effectively modulating the rotor current by the burst repetition rate which can be much lower than the normal rate of transistor switching during the burst. This low frequency burst modulation rate can then act like a signal injection to perform rotor position or velocity measurements through burst frequency content in the stator's back EMF in the manner of current injection systems.

Referring again to FIG. 8, it will also be appreciated that the buck converter of the impedance matching circuit 100 may be operated at a frequency so that the perturbations in current through the rotor coil 16 caused by the buck converter are not fully filtered by the inductance of the rotor coil 16 but create a measurable flux variation at the stator windings 12. These flux variations can be detected by the stator winding control unit 20 and used to detect the rotational speed and position of the rotor 17, again according to well understood current injection sensing techniques, albeit, operating from the rotor to the stator. More specifically, the stator winding control unit 20 may include a demodulator detecting a ripple in the amplitude of the flux from the buck converter which will have a rotor 17 position dependent presence in the back EMF o the stator. This information may be used for speed and position control of the wound field synchronous machine 10.

It will further be appreciated that additional sets of capacitor plates 26 may be added for three-phase or multiphase operation.

II. Combination Capacitive Encoder and Diode Array

Figure 11:
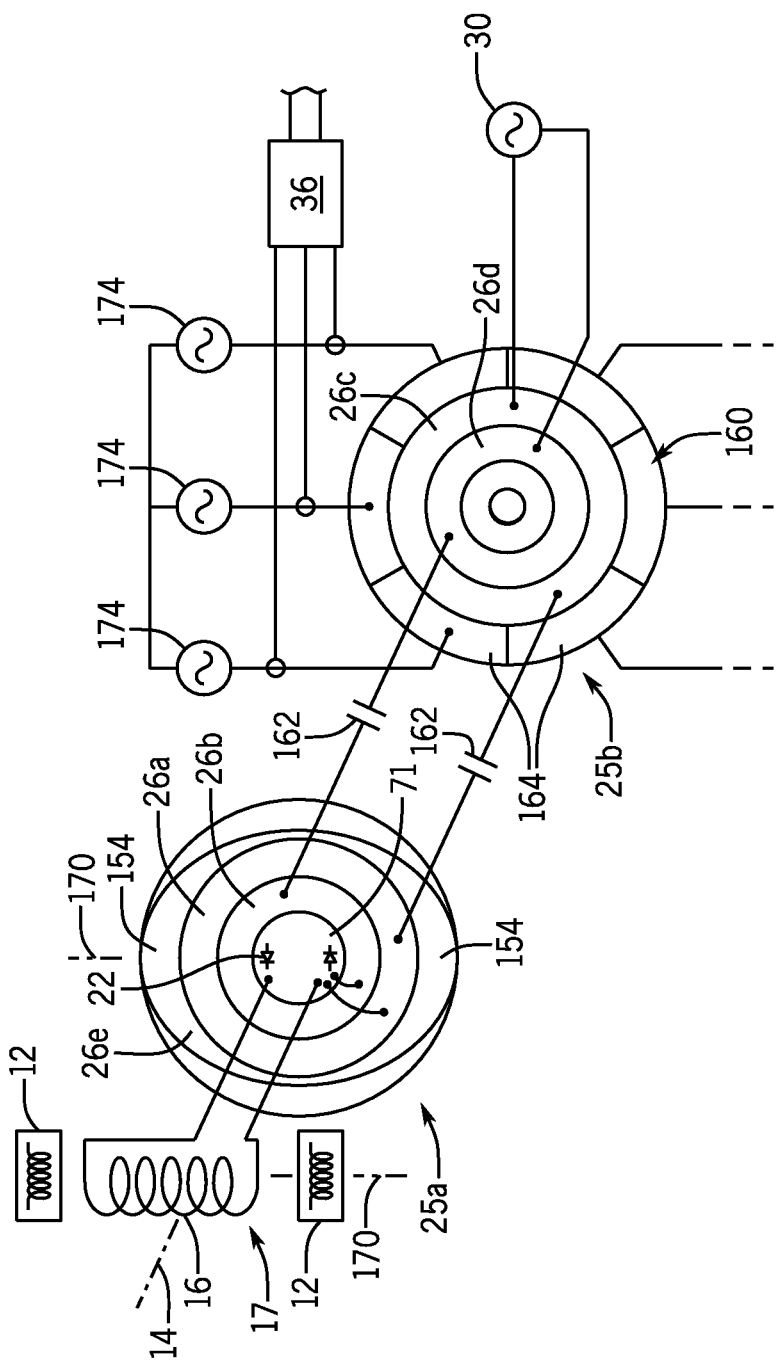
FIG. 11 is an exploded simplified view a capacitive encoder also supporting a rectifier assembly and capacitive coupling electrodes as discussed above, employing a multiphase excitation signal.

Referring now to FIG. 11, in one embodiment the disk 25a attached to the rotor 17 may have an outer electrically conductive plate 26e positioned outside of plate 26b and separated therefrom by a gap, the conductive plate 26e providing a pair of oppositely directed radial lobes 154 optionally equal in number to, and at the angular spacing of, the motor poles. As depicted, on a two pole motor, there will be two lobes 154 in diametric opposition. The lobes 154 are shown extending outwardly but conceivably could extend inwardly as well to provide an increased area of selected regions of the plate 26a as they pass over an electrically conductive detector plate 160 on the disk 25b as will be described below.

As in the previous embodiments, inside of the outer plate 26a there may be an electrically conductive plate 26b so that plates 26a and 26b may provide capacitive coupling 162 with corresponding plates 26c and 26d on stationary disk 25b for power transfer to the rotor 17.

The outer plate 26a and inner plate 26b surround and communicate with a central circuit region 71 within the plate 26b holding a power processing circuit such as a full-wave rectifier which may process the AC received by the plates 26a and 26b, rectify it, and apply it to the rotor coil 16.

As mentioned above, in this embodiment, the disk 25b includes a detector plate 160 being a circumferential ring positioned to underlie the lobes 154 of the disk 25a as they move circularly about the motor axis 14. This outer detector plate 160 is composed of a set of distinct arcuate plate segments 164 of equal angular extent. In one embodiment, there may be six plate segments 164 with one plate segment 164 centered on each pole axis 170 defining the primary force vector of the pole defined by the stator windings 12. The lobes 154 and detector plate 160 together provide a capacitive encoder revealing the rotational position of the rotor 17. This rotation signal is obtained by measuring the changing capacitance between individual plate segments 164 and the lobes 154 as the lobes 154 align with and then move away from alignment with particular plate segments 164.

One method of measuring this capacitance, shown in FIG. 11, provides a set of three phased voltage sources 174, for example, having relative phase spacing of 120°. These phased voltage sources 174 are provided, respectively, to the three plate segments 164 associated with each pole. Referring also to FIG. 12, as a lobe passes the various plate segments 164a-164c, it provides a changing capacitance between adjacent plate segments 164 shown by capacitances A, B, and C defining the current flow sensed through each of the plate segments 164a-164c. These current flows between plate segments 164 from the different phased power sources 174 may be measured, for example, by current probes and processed by a monitoring circuit 36 to extract a set of three amplitude envelopes 180a-180c roughly indicating when the thickest part of the lobe 154 is aligned with the particular plate segment 164 such as causes a relatively greater current flow with respect to that plate segment 164. In this example, current flows from diametrically opposed plate segments 164 may be combined for this current measurement based on the fundamental symmetry of the lobes 154.

The envelopes 180a-180c describe a three-phase signal with each envelope 180 separated by approximately 120°. After demodulation of the signal to extract the low frequency envelopes 180, a Clarke transform or similar approach may be used to produce a quadrature wave form 182 having two waveforms (I and II) with a 90° phase shift useful for motor control. Both the three-phase signal and the quadrature waveform 132 allow rotor speed and direction to be determined. Generally, the amplitude of the signals provides information about a position of the rotor with respect to the plate segments 164 and unique, in this example, within the range of the three-plate segment 164 (more generally, 360°/N where N is the number of lobes)). The direction of rotation will be indicated by the traveling wave sequence of the waveforms.

Figure 14:
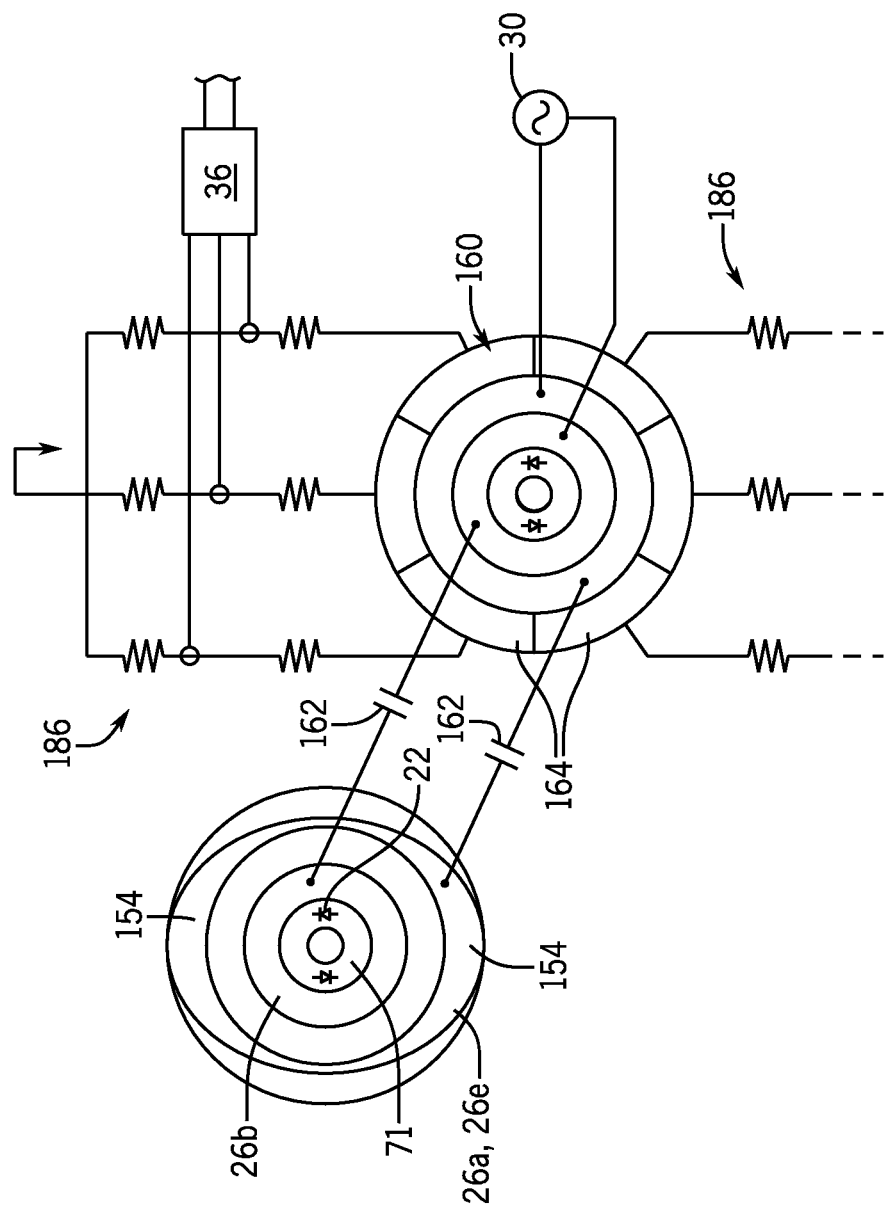
FIG. 14 is a figure similar to that of FIG. 11 showing a capacitive encoder employing a single phase excitation signal, for example, derived from a power coupling signal used to drive the rotor.

Referring now to FIG. 14, in an alternative embodiment, the plates 26a and 26e may be fused or electrically interconnected so that the energy used to measure capacitance between the lobes 154 and the detector plate 160 may be derived from the high-frequency AC current passing from drive electronics 30 through plates 26c and 26d having capacitive coupling 162 with plates 26a and 26b. In this case, each plate segment 164 may simply measure the electrical voltages returned through capacitive coupling from the electrically driven lobes 154 receiving an AC signal from the plate 26a. The voltage is on the plate segments 164 may be received by a resistive divider network 186 having voltage taps whose voltage can be measured by monitoring circuit 36 to produce envelopes 180 similar to those discussed above.

The capacitive encoder produced by the lobes 154 and their capacitive coupling to the detector plate 160 provide a position signal that repeats N times during a full rotation of the rotor 17 (N corresponding to the number of lobes). An absolute encoder can be produced, for example, by providing a homing signal at a unique rotational position, for example, using asymmetry in the lobes as discussed above with respect to scalloping or a separate detector system using other features of the disk 25a or independent measurements of motor saliency or the like. Multiple plates 26e (for example, concentrically arranged and angularly offset) and multiple lobes 54 associated with the different plates 26e may also be used to provide additional information to resolve angular ambiguity. In this way, an absolute encoder may be produced providing a rotation signal having a rotationally unique position value over a full 360° of rotor rotation. Such an absolute encoder allows the stator windings 12 (shown in FIG. 11) to be driven with the polarity matching on the particular orientation of the winding 16 (for example, up or down in the two pole example of FIG. 11).

Figure 15:
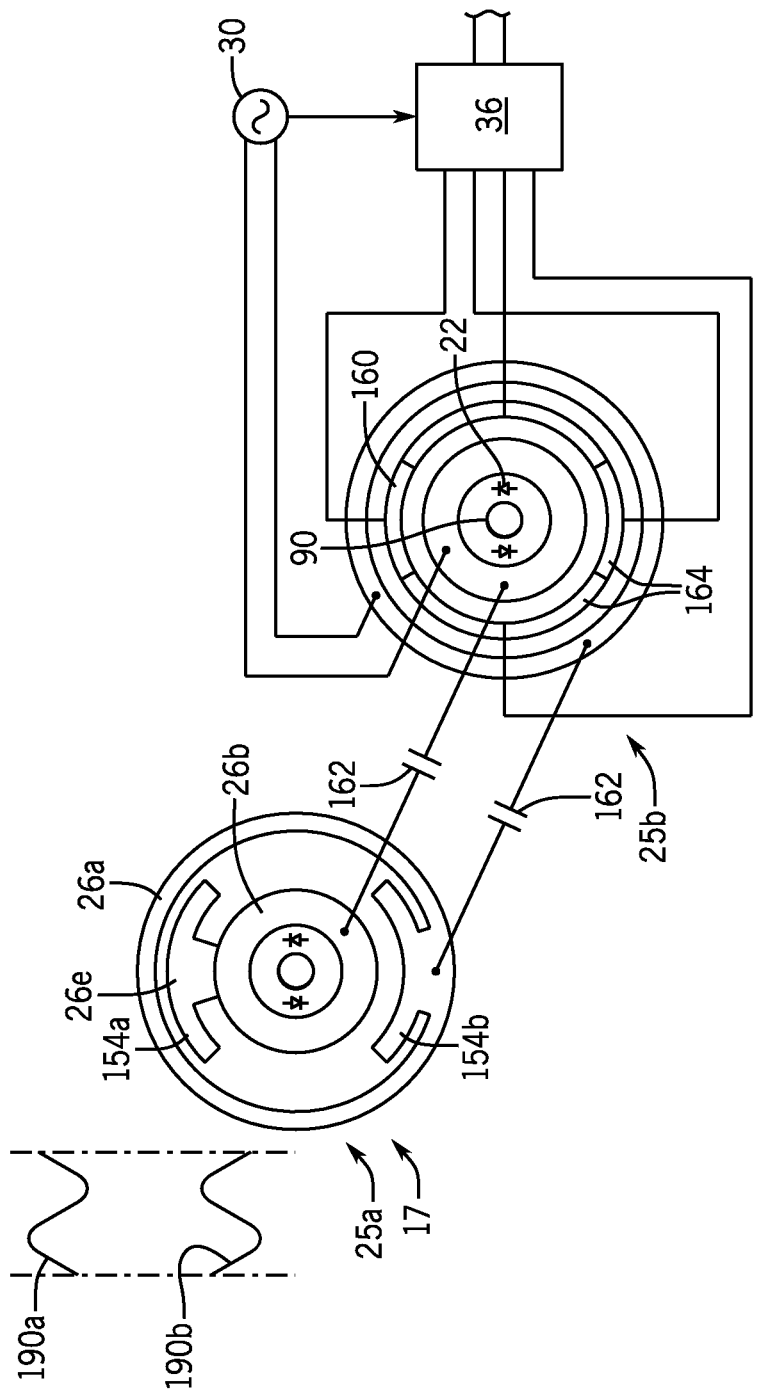
FIG. 15 is a figure to FIGS. 11 and 14 showing an alternative design providing absolute position over a complete rotation of the rotor shaft.

Referring now to FIG. 15 a simple and compact absolute encoder may be produced by applying differentially phased power 190a and 190b to different lobes 154a and 154b, for example, phased power 190a and 190b, having opposite polarities or 180° of phase difference. In the one embodiment as depicted, this may be done, for example, by attaching lobe 154a to plate 26a and lobe 154b to plate 26b which have opposite polarities. Alternatively as will be discussed below, an independent source of electrical power, for example, provided by harmonic injection of power through the stator windings 12 can be provided to the rotor to provide the necessary phased power 190.

Figure 16:
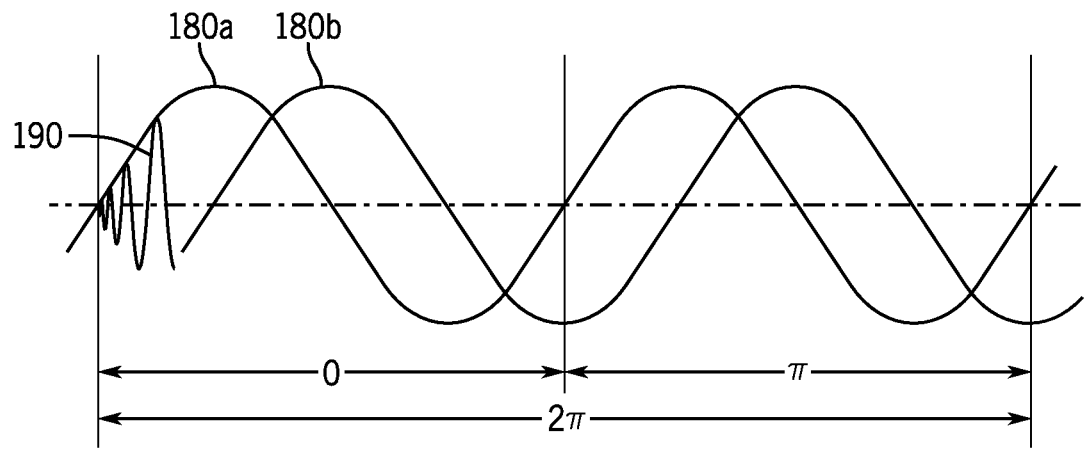
FIG. 16 is figure similar to that of FIG. 13 showing the envelope signals obtained from the encoder of FIG. 15 that can be further distinguished by an underlying phase of the modulated signal.

In this example, the plate 160 may have its plate segments 164 connected to a phase sensitive monitoring circuit 36. Referring now also to FIG. 16, the phase sensitive monitoring circuit 36 may operate in a manner similar to the monitoring circuit 36 described with respect to FIG. 11 to measure the received voltage or current from the phased power 190a and 190b and extract amplitude envelopes 180. In this example, for a two-pole motor as depicted, four plate segments 164 may be used spaced by 90°, and two amplitude envelopes 180a and 180b may be developed for pairs of diametrically opposite plate segments 164. The result is a quadrature phasing of amplitude envelopes 180a and 180b that may be directly used with many types of motor controllers and which provides both motor direction and a rotation signal as discussed above. The quadrature waveform of amplitude envelopes 180 will repeat twice for each 360° of rotor rotation and thus do not in themselves produce an absolute encoder; however, the monitoring circuit 36 is also sensitive to the phase of the phased power 190 defining the amplitude envelopes 180, for example, being locked to a phase reference from drive electronics 30 of other sources of power. Thus the two cycles of the amplitude envelopes 180 during each full rotation of the rotor 1 may be distinguished according to the phase of the underlying phased power 190 being received. Thus, for example, the lobe 154a having an arbitrarily designated positive polarity of an AC phased power 190 can be uniquely determined to be aligned with any of the four plate segments 164 based on its amplitude and the phase of the phased power 190 as distinguished from the lobe 154b which will present a different polarity of phased power 190. In this way an absolute encoder is produced without the need for additional plate area or measurement structures.

Because the amplitude of the amplitude envelope 180 and the polarity of the underlying phased power 190 are unique at each angular position of the rotor, a static determination of rotational position of the rotor 17 may be determined, for example, when the motor is first started.

Figure 17:
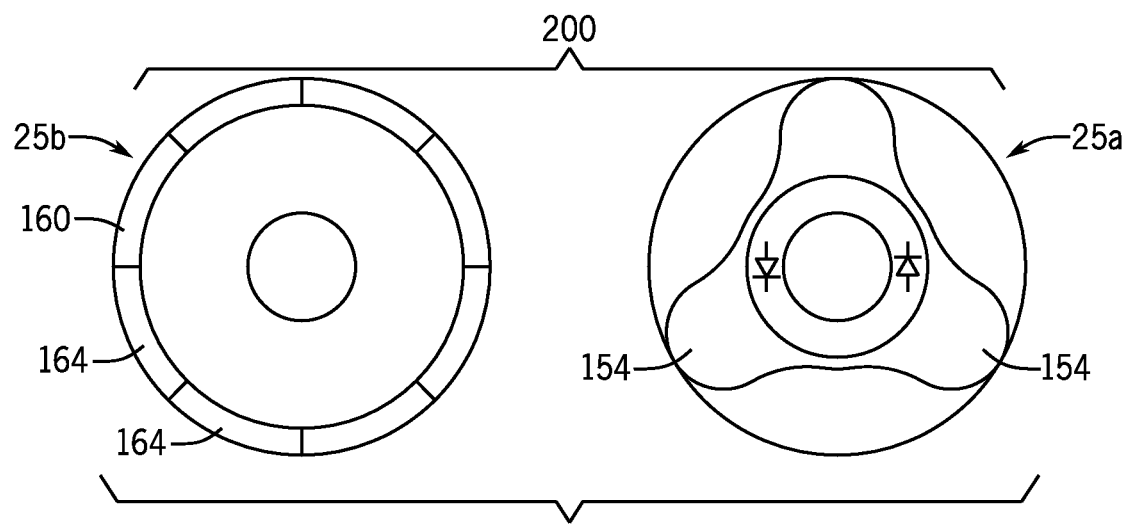
FIG. 17 is a simplified representation of the embodiment of FIG. 11 extended to a three pole motor.
Figure 18:
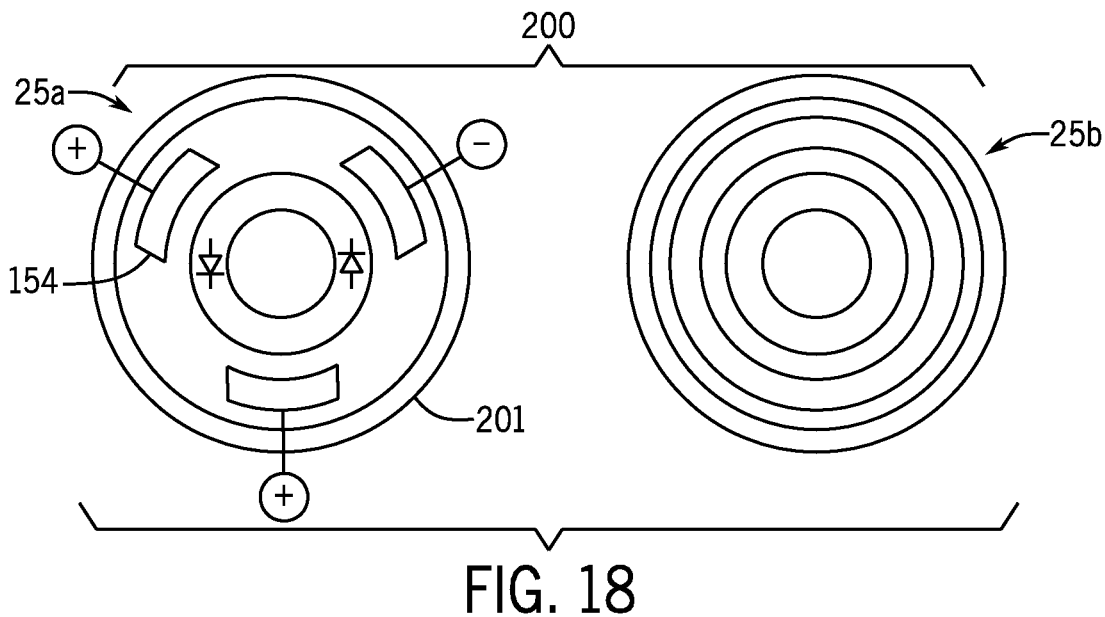
FIG. 18 is a Figure similar to FIG. 17 showing the embodiment of FIG. 15 extended to a three pole motor.

Referring now to FIGS. 17 and 18, the invention contemplates that the combination of a capacitive encoder 200 (for example, using lobes 154 and plate 160) and power processing circuitry 22 integrated on a single disk 25a may be used without necessarily implementing capacitive energy transfer to the rotor coil 16 (shown in FIG. 11). Thus, the disk 25a may be constructed without plates 26a and 26b potentially reducing its size or providing improved plate area. This configuration may be used when an alternative source of power transmission to the rotor 17 is available or desired, for example, power transfer via a transformer or inductive power system, the latter including, for example, a small commonly driven electric generator whose rotor is connected to the rotor of the wound field synchronous machine 10 to provide power to the rotor coil 16. In FIG. 18 an additional return plate 201 may be optionally used to provide a reference for the electrical voltages on lobes 154 or reference may be derived from a combination of voltages on lobes 154.

The present invention may be used with motors with additional numbers of poles, for example, as shown in FIG. 17, by providing additional lobes 154 corresponding to the additional poles (in this case a six-pole motor is depicted). As shown in FIG. 18, polarity decoding of the envelopes 180 may be provided with more than two poles, for example, by ensuring that different polarities of the signal phased power 190 can be sensed at any angular position compared to an angular position rotated by 360°/N where N is the number of lobes 54.

Figure 19:
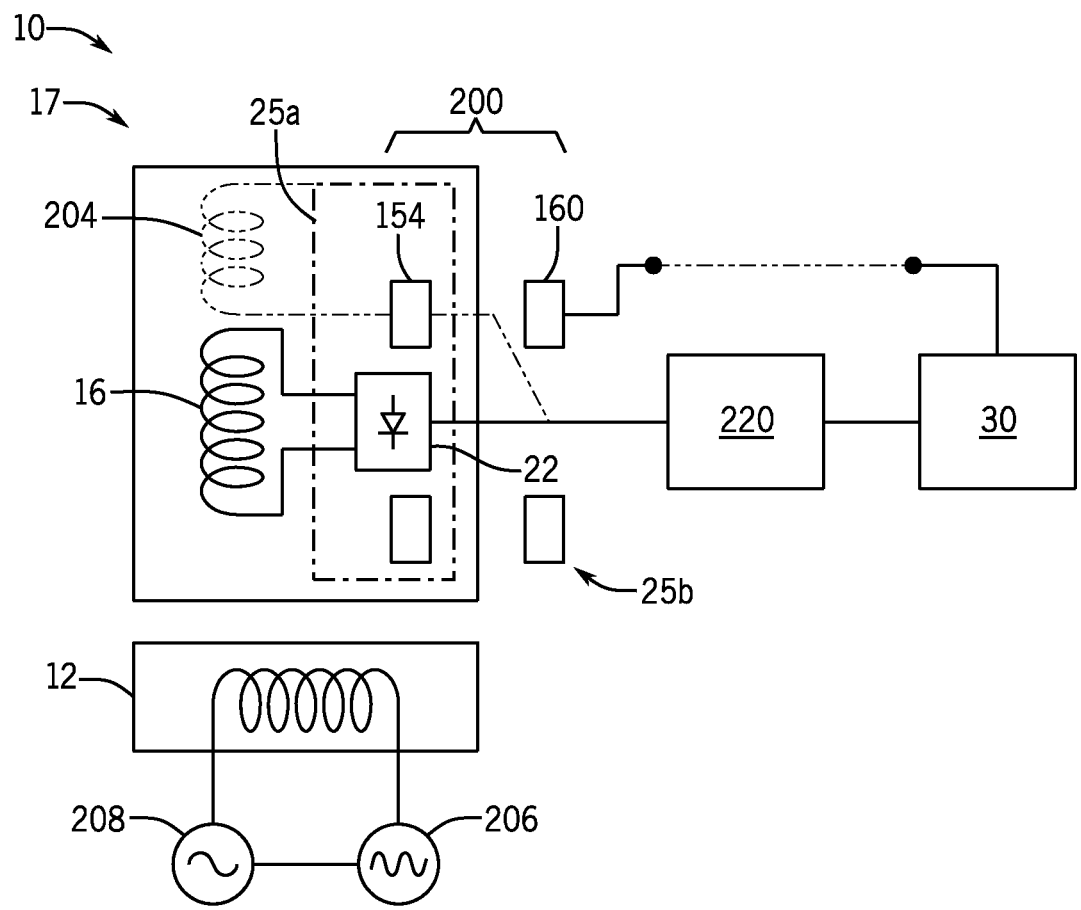
FIG. 19 is a block diagram showing the use of the present invention with a general wireless coupler not necessarily being a capacitive coupling system.

Referring now to FIG. 19, it will be appreciated that a generalized electrical machine 10 for use with the present invention may provide for a rotor 17 with a rotor coil 16 and a disk 25a having the central circuit region 71 for holding power processing circuitry 22 and for holding a capacitive encoder 200 comprised of lobes 154 and plate 160. Power may be provided to the rotor coil 16 by a variety of different methods including an AC brushless power coupler 220 using capacitive coupling as described above or using inductive coupling, or a transformer or the like. Power for the capacitive encoder 200 may be variously provided from a separate power source on the drive electronics 30 or off of the power supplied by the AC brushless power coupler 220 or through a set of auxiliary windings 204 on the rotor 17 that receive a harmonic signal from source 206 at a different frequency than the stator drive source 208 through inductive coupling from the stator windings 12.

Features not specifically described in this embodiment may employ features and construction principles of other embodiments and vice versa.

It will be appreciated that the above-described principles and apparatus may also be used with respect to a wound field synchronous machine 10 configured as a generator in which a magnetic field is established on a rotor coil 16 through a rotor power processing circuitry 22 which receives an AC signal on lines 34 through first coupler capacitor disk 25 from drive electronics 30. In this case, the stator windings 12 may be attached to drive a load.

In this regard, the invention contemplates that the drive electronics 30 may be placed directly on the disk 25b, for example, at an analogous location to the central circuit region 71 of the disk 25a. In this case, the perpendicular conductors 21 may be replaced with bus 66 and conductor tab 86 to allow communication between the drive electronics 30 and the inner and outer plates 26c and 26d.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An electrical rotating machine comprising:
   a stator for providing a magnetic field;
   a rotor providing a second magnetic field mounted for rotation about a rotor axis with respect to the stator and including at least one electrical coil having a coil axis with a component perpendicular to the axis;
   a brushless AC power coupler communicating AC power to the rotor from a source stationary to the stator;
   a capacitive encoder providing an opposed stationary and rotational support separated by a gap with the rotational support mounted to the rotor and the stationary support stationary to the stator, each of the stationary and rotational supports having respective opposed electrical plates having a capacitive coupling adapted to provide a rotation signal indicating rotation of the rotor with respect to the stator; and
   solid-state power conversion circuitry held on the rotational support communicating electrical power between the brushless AC power coupler and the electrical coil.

2. The electrical rotating machine of claim 1 wherein the rotation signal indicates a unique absolute position of the rotor with respect to the stator over 360° of rotation of the rotor with respect to the stator.

3. The electrical rotating machine of claim 2 wherein the rotation signal indicates the unique absolute position of the rotor both when the rotor is stationary with respect to the stator and when the rotor is moving with respect to the stator.

4. The electrical rotating machine of claim 1 wherein the support is a plate extending symmetrically about the rotor axis in a plane perpendicular to the rotor axis.

5. The electrical rotating machine of claim 4 wherein the plate is a polymer substrate clad with conductive traces forming a capacitive plate of the capacitive encoder and electrical interconnections between solid-state components of the solid-state power conversion circuitry.

6. The electrical rotating machine of claim 1 wherein the electrical plate on the rotational support has a variable radial extent causing a periodic variation in capacitance between the electrical plate on the rotational support and at least one electrical plate on the stationary support as a function of rotational position of the rotor with respect to the stator.

7. The electrical rotating machine of claim 1 wherein the opposed stationary and rotational supports further include opposed second electrical plates operating together to conduct electrical power capacitively between the stationary support and the solid-state power conversion circuitry on the rotational support.

8. The electrical rotating machine of claim 7 further including a power source providing AC power through a circuit including the electrical plates, the solid-state power conversion circuitry assembly, and the electrical coil.

9. The electrical rotating machine of claim 7 wherein the opposed stationary and rotational supports further include opposed third electrical plates operating together with the second electrical plates to conduct electrical power capacitively from the stationary support to the solid-state power conversion circuitry on the rotational support.

10. The electrical rotating machine of claim 1 wherein the capacitive encoder includes a drive circuit providing a first and second encoder signal with a first phase and second different phase respectively; and
wherein the capacitive encoder further includes at least two pairs of opposed electrical plates on respective of the stationary and rotational support, the first opposed electrical plates of each pair conducting the first signal and the second opposed electrical plates of each pair conducting the second signal; and
further including a decoder circuit monitoring capacitive coupling and signal phase of the first and second encoder signals to provide the rotation signal indicating a unique position of the rotor with respect to the stator over 360° rotation of the rotor with respect to the stator.

11. The electrical rotating machine of claim 10 wherein the first and second encoder signals have 180° of phase difference.

12. The electrical rotating machine of claim 1 wherein the solid-state power conversion circuitry is positioned near a center of the rotational plate about the rotational axis with respect to the electrical plates which are positioned near an edge of the rotational plate away from the rotational axis with respect to the solid-state power conversion circuitry assembly.

13. The electrical rotating machine of claim 1 wherein the opposed electrical plate on the stationary support provides a set of plate elements independently sensing capacitive coupling to the opposed electrical plate on the rotational support and wherein a number of plate elements is 3N where N is an integer such as to provide a three-phase rotation signal.

14. The electrical rotating machine of claim 13 further including a decoder receiving the three-phase rotation signal to provide a signal indicating rotational direction of the rotor.

15. The electrical rotating machine of claim 1 wherein the solid-state power conversion circuitry is a wave rectifier.

16. The electrical rotating machine of claim 1 wherein the brushless AC power coupler is selected from the group consisting of capacitive couplers and inductive couplers.

17. The electrical rotating machine of claim 1 further including a second brushless AC power coupler communicating AC power to the rotor from a source stationary to the stator, the AC power of the second brushless AC power coupler providing a measuring signal for measurement of capacitive coupling of the capacitive encoder.

18. The electrical rotating machine of claim 17 wherein the second brushless AC power coupler uses a stator winding for inductive coupling.

19. The electrical rotating machine of claim 17 wherein the second brushless AC power coupler is a capacitive coupler.

20. The electrical rotating machine of claim 1 wherein the opposed electrical plate on the stationary support provides a set of plate elements independently sensing capacitive coupling to the opposite electrical plate on the rotational support and wherein a number of plate elements is 4 to provide a quadrature rotation signal.

* * * * *